United States Patent [19]

Mack

[11] 4,418,924

[45] Dec. 6, 1983

[54] BI-SURFACE SEALING MECHANISM WITH ROLLING/SLIDING O-RING

[76] Inventor: James F. Mack, 541 N. Bertrand, Flagstaff, Ariz. 86001

[21] Appl. No.: 388,929

[22] Filed: Jun. 16, 1982

Related U.S. Application Data

[63] Continuation-in-part of Ser. No. 199,112, Oct. 20, 1980, abandoned.

[51] Int. Cl.$^3$ .......................... F16J 9/00; F16J 15/56
[52] U.S. Cl. .................................. 277/177; 277/173; 92/169; 92/248; 251/DIG. 1
[58] Field of Search ............... 92/89, 98 D, 169, 248, 92/249; 251/DIG. 1; 277/173–177

[56] References Cited

U.S. PATENT DOCUMENTS

| | | | |
|---|---|---|---|
| 2,317,034 | 4/1943 | Dalkin | 277/177 |
| 2,394,364 | 2/1946 | Christensen | 277/59 |
| 2,614,793 | 10/1952 | Storm | 277/177 X |
| 2,640,745 | 6/1953 | Wait | 92/249 X |
| 2,738,803 | 3/1956 | Manning | 251/277 X |
| 3,466,054 | 9/1969 | Berg | 277/169 |
| 3,806,136 | 4/1974 | Warner et al. | 277/40 |

FOREIGN PATENT DOCUMENTS

| | | | |
|---|---|---|---|
| 1814426 | 9/1970 | Fed. Rep. of Germany | 277/177 |
| 1364039 | 5/1964 | France | 277/177 |
| 6411501 | 4/1965 | Netherlands | 277/177 |
| 826521 | 1/1960 | United Kingdom | 277/177 |
| 936382 | 9/1963 | United Kingdom | 92/89 |

Primary Examiner—Robert S. Ward, Jr.
Attorney, Agent, or Firm—Drummond, Nelson & Nissle

[57] ABSTRACT

A sealing mechanism positioned between a movable piston wall and stationary cylinder wall concentric therewith. The sealing mechanism includes a circumferential groove formed in one of the concentric walls, and an O-ring positioned in the circumferential groove, the O-ring having a diameter less than the axial length of the groove and being compressed between a pair of opposing surfaces, a first surface formed integrally on the floor of the circumferential groove and a second surface formed integrally on one of the concentric walls. At least one of the pair of opposing surfaces has at least one upstanding serration for engaging the O-ring and forcing the O-ring to rotate when it moves from side to side in the circumferential groove.

1 Claim, 12 Drawing Figures

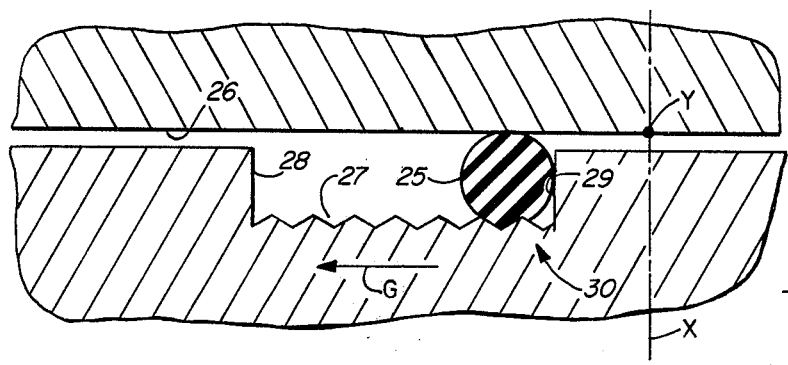
FIG._8A
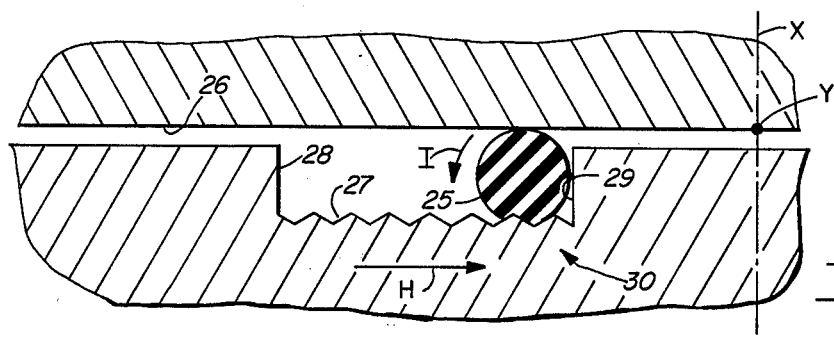
FIG._8B
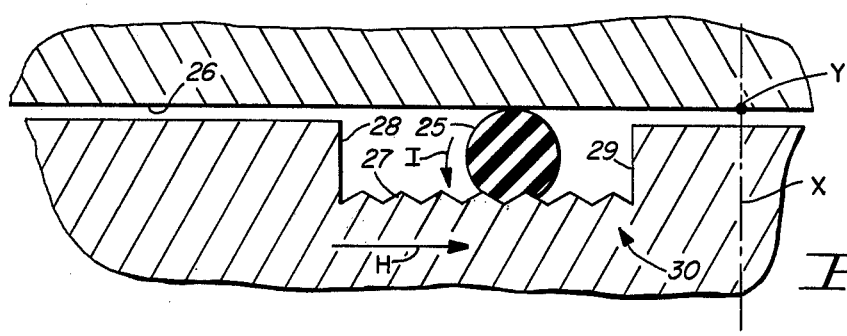
FIG._8C
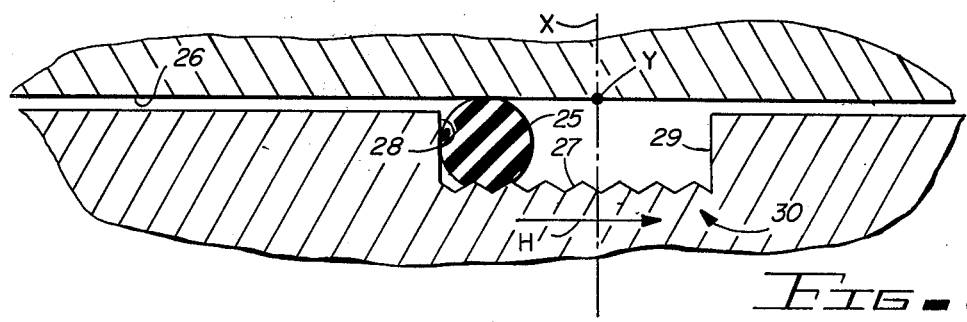
FIG._8D
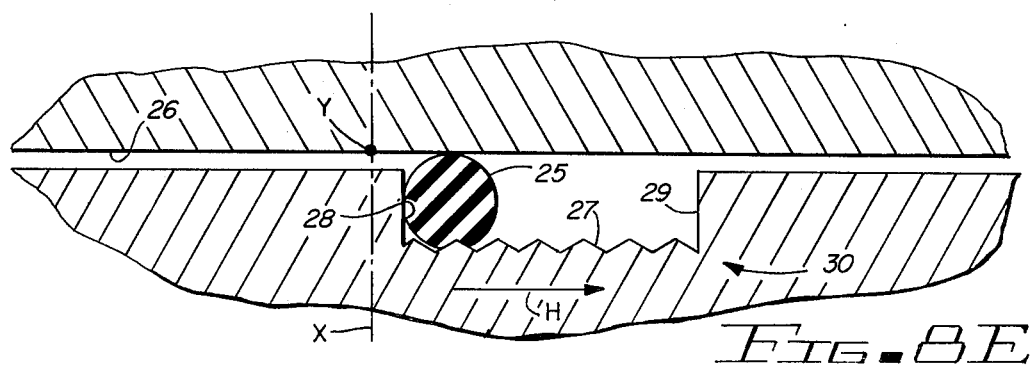
FIG._8E

BI-SURFACE SEALING MECHANISM WITH ROLLING/SLIDING O-RING

This application comprises a continuation-in-part of my co-pending application for "Bi-Surface Sealing Mechanism", Ser. No. 199,112, filed Oct. 20, 1980, now abandoned.

This invention relates to a sealing mechanism positioned between a movable piston wall and stationary cylinder wall concentric therewith.

More particularly, the invention relates to a sealing mechanism positioned between a movable piston wall and stationary cylinder wall concentric therewith in which an O-ring is compressed between the cylinder wall and the floor surface of a circumferential groove formed in the wall of the piston.

In another respect, the invention relates to a sealing mechanism positioned between a movable piston wall and stationary cylinder wall concentric therewith in which an O-ring is retained in a circumferential groove formed in the wall of the piston and moves from side to side in the groove when the piston is axially reciprocated in the cylinder.

In a further and more specific respect, the invention relates to a fluid sealing mechanism of the type described in which the floor of the circumferential groove has upstanding serrations which force the O-ring to roll as it moves from side to side in the groove.

Forming a seal by compressing an O-ring between a cylinder wall and the floor of a circumferential groove formed in an adjacent piston wall is well known in the art. The axial width of such circumferential grooves is often made greater than the diameter of the O-ring under the assumption that the O-ring will "roll" along the groove when the piston reciprocates in the cylinder. See for example U.S. Pat. Nos. 2,317,034 to Dalkin and 2,394,364 to Christensen. However, as described in the Parker "O" Ring Handbook No. ORD-5700, under actual operating conditions the O-ring does not roll but instead slides from side to side in the groove during all but a small fraction of a reciprocating stroke of the piston.

O-rings utilized in circumferential grooves having an axial width greater than the compressed axial diameter of the O-ring are susceptible to a phenomenon known as "spiral failure". Spiral failure occurs when some segments of the O-ring roll while other adjacent segments slide such that two adjacent portions of the O-ring are twisted in relation to one another. An excessive cumulative amount of twisting will cause the surface of the O-ring to rupture and eventually may result in a complete break or separation at some point along the O-ring. The occurance of such "spiral failure" can be minimized by insuring that the entire length of the O-ring rolls during its side to side travel in the groove.

Rotation of the O-ring during its side to side travel in a circumferential groove is, of course, further desirable since such a rolling O-ring presents a new sealing surface to the wall of the cylinder with each reciprocation of the piston, thereby increasing the effective operational life and efficiency of sealing of the O-ring.

One means developed to insure the rotation of the O-ring during movement of the piston is to compress the O-ring against an annular support member positioned in the groove. When the piston reciprocates the frictional contact of the O-ring with the wall of the cylinder causes the O-ring to rotate in the annular support member. See U.S. Pat. Nos. 2,738,803 to Manning, 3,466,054 to Berg and 3,806,136 to Warner, et al. A disadvantage of this approach is that machining or forming the annular member supporting and containing the O-ring requires additional time and expense in comparison to the conventional flat bottomed groove. In addition, the frictional force generated when a portion of the O-ring slides over the surface of the cylinder wall may not be sufficient to overcome the opposing frictional force between the O-ring and floor surface of the annular support member. In this case the O-ring would once again slide over the cylinder wall.

Accordingly, it would be highly desirable to provide a sealing mechanism which would insure the rotation of an O-ring as it moved from side to side in a circumferential groove during reciprocation of the piston in the cylinder.

Therefore, it is a principle object of the present invention to provide an improved sealing mechanism for use between a movable piston wall and stationary cylinder wall.

A further object of the invention is to provide an improved sealing mechanism of the type in which an O-ring positioned in a circumferential groove formed in the wall of the piston rotates as it moves from side to side in the groove while the piston is axially reciprocated within the cylinder.

Still another object of the invention is to provide an improved sealing mechanism of the type described which reduces the likelihood of spiral failure of the O-ring and increases the effective life and efficiency of sealing of the O-ring.

These and other, further and more specific objects and advantages of the invention will be apparent to those skilled in the art from the following detailed description thereof, taken in conjunction with the drawings, in which;

FIGS. 8A to 8E illustrate another presently preferred embodiment of the invention.

Briefly, in accordance with the invention, I provide an improved sealing mechanism for use between a movable piston wall and stationary cylinder wall concentric therewith. The sealing mechanism comprises a circumferential groove formed in one of the concentric walls, an endless annular elastic hose positioned in the circumferential groove and compressed between a pair of surfaces, a first surface formed on the floor of the circumferential groove, and a second surface formed on one of the concentric walls, the second surface generally opposing the first surface. The annular hose has a diameter less than the axial length of the circumferential groove. One of the pair of opposing surfaces has at least one upstanding serration for engaging the annular hose and forcing the hose to rotate when the hose moves from side to side in the circumferential groove.

Figure 1:
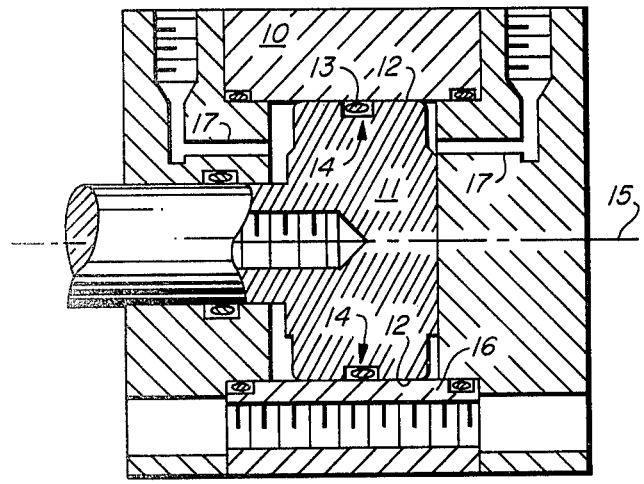
FIG. 1 is a section view of a piston and cylinder wherein the piston is provided with an O-ring slidably positioned in a circumferential groove formed in the piston wall.

Turning now to the drawings, which depict the presently preferred embodiments of the invention for the purpose of illustrating the practice thereof and not by way of limitation of the scope of the invention, and in which like reference characters identify the same elements in the several views, FIG. 1 illustrates a piston 11 which reciprocates within cylinder walls 10 and along axis 15 and is provided with an O-ring 13 compressed between the floor of circumferential groove 14 and cylinder wall surface 12. The axial width of circumferential groove 14 is greater than the compressed diameter of O-ring 13 so that O-ring 13 moves from side to side in groove 14 during the reciprocation of piston 11. Pressurized fluid entering through channels 17 reciprocates piston 11 along axis 15.

Figure 2:
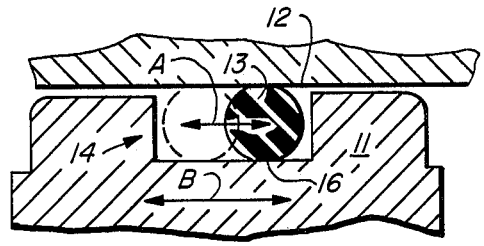
FIG. 2 is a kinematic sketch indicating the sliding movement of an O-ring positioned in a conventional circumferential piston groove.
Figure 3:
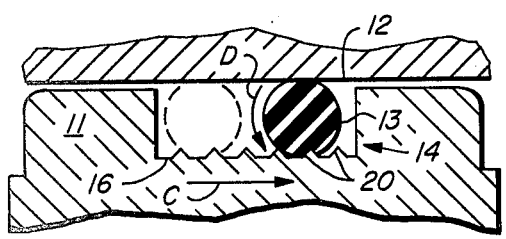
FIG. 3 is a kinematic sketch illustrating the rolling movement of an O-ring positioned in a circumferential groove constructed in accordance with the invention.
Figure 4:
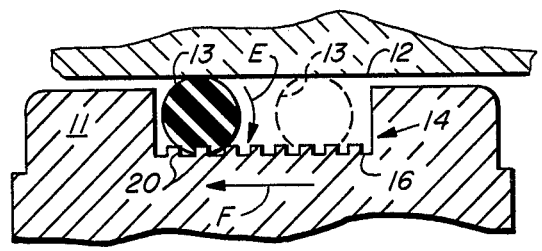
FIG. 4 is a kinematic sectional view indicating the rolling movement of an O-ring positioned in a circumferential groove constructed in accordance with the present invention.
Figure 5:
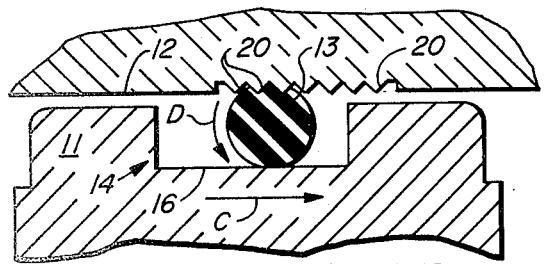
FIG. 5 is a partial sectional view of a sealing mechanism incorporating the principles of the present invention.
Figure 6:
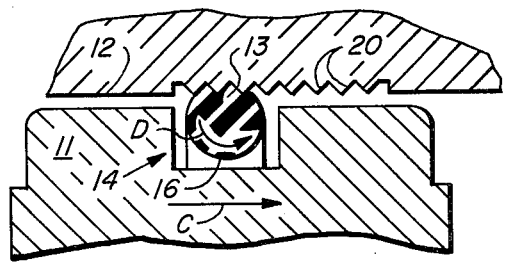
FIG. 6 is a partial sectional view of a sealing mechanism constructed in accordance with the instant invention.
Figure 7:
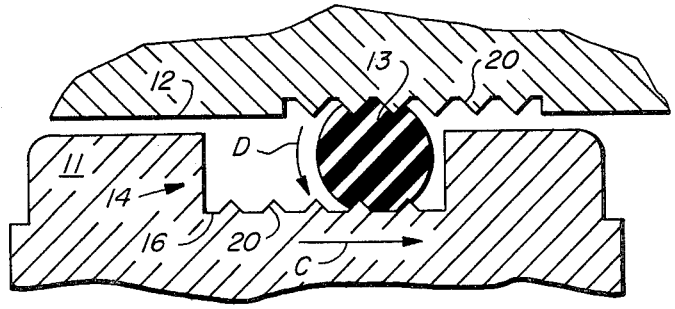
FIG. 7 is a partial sectional view illustrating the mode of operation of a sealing mechanism constructed in accordance with the invention.

As illustrated in FIG. 2, in the prior art both the floor 16 of groove 14 and cylinder wall 12 were relatively smooth surfaces and O-ring 13 would slide from side to side in groove 14 as shown by arrows A when piston 11 reciprocated in the directions of arrows B along axis 15.

FIGS. 3–7 illustrate the presently preferred embodiments of the invention. In each embodiment at least one of the surfaces 12, 16 is provided with upstanding projections or serrations 20 which engage the O-ring 13 and force the ring 13 to rotate when piston 11 moves relative to cylinder walls 12. As demonstrated by FIGS. 3 and 4 serrations 20 may be triangular, rectangular, or take on a variety of other shapes. In addition, as would be appreciated by those skilled in the art, serrations 20 need not be evenly spaced. Similarly, projections 20 could form a striated pattern on surfaces 12 and/or 16, could form a pattern of discrete upstanding points similar to those found in Braille, or could form numerous other patterns which would function to engage and force hose 13 to rotate when piston 11 moved within cylinder wall 10.

It is not necessary that the opposing surfaces 12, 16 compressing O-ring 13 be parallel. For example, in FIG. 6 floor surface 16 of groove 14 is curved such that ring 13 is retained and rotates therein during movement of piston 11.

In operation, as shown in FIGS. 3–7, movement of piston 11 in the direction of arrows C causes O-ring 13 to rotate in the direction of arrows D. O-ring 13 rotates in the direction of arrow E when piston 11 is displaced in the direction of arrow F. Serrations 20 force ring 13 to roll as ring 13 moves from side to side in groove 14 of FIGS. 3, 5, 6 and 7 and force ring 13 to rotate in the annular groove 14 of FIG. 4. Rotation of O-ring 13 presents a new sealing surface to the wall of the cylinder or piston with each reciprocation of the piston and increases the operational life and efficiency of sealing of the O-ring. Serrations 20 cause O-ring 13 to rotate at a relatively uniform rate along the entire length thereof.

The embodiment of the invention shown in FIGS. 3–4, 8A–8E comprises a combination sliding-rolling seal. In high pressure applications a sliding seal is preferred because it prevents less fluid, i.e., gas or liquid, from bypassing the seal. A rolling seal tends to function like an ink roller and to carry, on the seal surface, fluid from the area containing pressurized fluid past the point(s) where the seal contacts the surface(s) being sealed and into areas not intended to receive or contain fluid.

As shown in FIGS. 8A–8E, when O-ring seal 25 is in position against upstanding wall 29 of groove 30 and the piston in which groove 30 is formed is moving in the direction of arrow G while surface 26 remains stationary, O-ring seal 25 does not move and the portion of seal 25 contacting surface 26 slides along surface 26. Teeth 27 maintain seal 25 in fixed position against wall 29. In FIGS. 8A–8E, vertical line X and point Y where line X intersects stationary surface 26 are provided as fixed references to demonstrate the movement of groove 30 and seal 25 with respect thereto.

After the piston containing groove 30 stops moving in direction G and reverses itself and begins moving in the direction indicated by arrow H in FIGS. 8B–8E, hose 25 begins rolling as indicated by arrow I in FIGS. 8B, 8C. Teeth 27 generally insure that each portion rotates at the same rate as other portions of seal 25 and, consequently, tends to minimize the likelihood of spiral failure of the seal.

After the piston in which groove 30 is formed begins moving in the direction indicated by arrow H in FIG. 8B, seal 25 continues to roll between toothed floor 27 of groove 30 and surface 26 (FIG. 8C) until seal 25 abut against wall 28 of groove 30 as shown in FIG. 8D. As is depicted in FIG. 8E, after seal 25 rolls against wall 28, it remains stationary while the piston continues to move in direction H. Striations 27 prevent seal 25 from rolling while it is in position against wall 28 and the piston is moving in direction H. While seal 25 is fixed in position against wall 28 and the piston is moving in direction H, the portion of seal 25 contacting surface 26 slides along surface 26. When the piston stops moving in direction H and again begins moving in direction G, seal 25 rolls across groove 30 to the position shown in FIG. 8A. Once seal 25 reaches the position shown in FIG. 8A, it remains in that position and in sliding contact with surface 26 while the piston continues to move in direction G.

In use of the embodiment of the invention shown in FIGS. 8A–8E, the width of groove 30 (the distance between the vertical lines representing walls 28, 29 in FIGS. 8A–8E) is minimized so that seal 25 only rotates a relatively short distance when moving from wall 29 to wall 28 after the piston stops moving in direction G and begins moving in direction H. This minimizes the time the seal is rolling and allows seal 25 to primarily function as a sliding seal, which is, as earlier noted, desired in high pressure applications. However, the rolling feature of the seal, since it provides two different seal surfaces in sliding contact with surface 26, doubles the useful life of the seal. If striations 27 were not provided along the floor of groove 30 as shown in FIGS. 3, 4, 8A–8E seal 25 would be susceptible to spiral failure or would tend to simply slide back and forth in groove 30. Although the floor of groove 30 is pictured as being generally flat, i.e., striations 27 shown in the cross-sectional view of groove 30 in FIGS. 8A–8E generally lie along an imaginary line parallel to the line representing surface 26, it might be desirable to form the floor of groove 30 such that striations 27 generally lie along a sinuate or concave or convex line.

As earlier noted, the word serration as used herein includes serrations, striations, deticulations and any other type, or shape of seal engaging projections or edges.

Having described my invention in such terms as to enable those skilled in the art to understand and practice it, and having described the presently preferred embodiments thereof, I claim:

1. In combination with a piston
   having a cylindrical outer wall,
   having an imaginary centerline parallel to said cylindrical outer wall, and
   moving in a direction of travel parallel to said centerline,
   and a stationary cylinder wall concentric and adjacent to said cylindrical outer wall of said piston,
   (a) a circumferential groove formed in one of said concentric walls and including
      (i) a floor having serrations formed therein,
      (ii) a pair of upstanding generally opposed elongate curved walls,
   the shortest distance across said groove between said opposed wall thereof being generally constant along the length of said circumferential groove, and
   (b) an endless annular elastic hose generally having, prior to being compressed in said groove,
      (i) a constant circular cross-sectional area along the length thereof, and
      (ii) a smooth continuous cylindrical surface area,
   said annular elastic hose being positioned in said circumferential groove against one of said opposed walls of said groove and compressed between
      (c) said serrated floor of said groove, and
      (d) a second surface formed integrally on one of said concentric walls,
   said shortest distance across said groove being such that during movement of said piston in said direction of travel parallel to said centerline, said hose
      (e) rolls away from one of said opposed walls of said groove and between said floor of said groove and said second surface toward said other of said pair of opposed walls of said groove,
      (f) rolls to a position against said other of said pair of opposed walls of said groove, and
      (g) maintains
         (i) said position against said other of said pair of opposed walls of said groove, and
         (ii) sliding contact with said second surface formed integrally on one of said concentric walls,
      while said piston continues to move in said direction parallel to said piston centerline,
   said serrations maintaining said hose in generally fixed position against said other of said pair of opposed walls of said groove while said piston continues to move in said direction of travel and causing said hose to roll at a generally equivalent rate along the length thereof from said one of said pair of opposed walls of said groove to said other of said pair of opposed walls of said groove.

* * * * *